United States Patent [19]
Kamphuis

[11] 3,982,480
[45] Sept. 28, 1976

[54] COLUMN FOR DRAINING A WHEY-CURD MIXTURE

[75] Inventor: Gerrit George Kamphuis, Gorredijk, Netherlands

[73] Assignee: Stork Amsterdam B.V., Amstelveen, Netherlands

[22] Filed: Aug. 25, 1975

[21] Appl. No.: 607,818

[30] Foreign Application Priority Data
Aug. 27, 1974 Netherlands ............................ 7411421

[52] U.S. Cl. .................................................. 99/456
[51] Int. Cl.² .......................................... A01J 25/11
[58] Field of Search ...................... 99/456, 454, 458

[56] References Cited
UNITED STATES PATENTS

| 675,874 | 6/1901 | Minds .................................... 99/456 |
| 3,032,877 | 5/1962 | Collins .................................... 99/458 |
| 3,468,026 | 9/1969 | Robertson et al. ................... 99/454 |
| 3,606,683 | 9/1971 | Joux et al. ......................... 99/456 X |

*Primary Examiner*—Peter Feldman
*Assistant Examiner*—Arthur O. Henderson
*Attorney, Agent, or Firm*—Haseltine, Lake & Waters

[57] ABSTRACT

A draining column consisting of an upright perforated sleeve with a supply for a whey-curd mixture at the top and a discharge device for the curd bar at the bottom. The upper portion of the sleeve is surrounded at some distance by a jacket. In the annular interspace a liquid is maintained at a specific level and under a controllable pressure to regulate the speed with which the whey leaks through the perforations of the sleeve.

4 Claims, 4 Drawing Figures

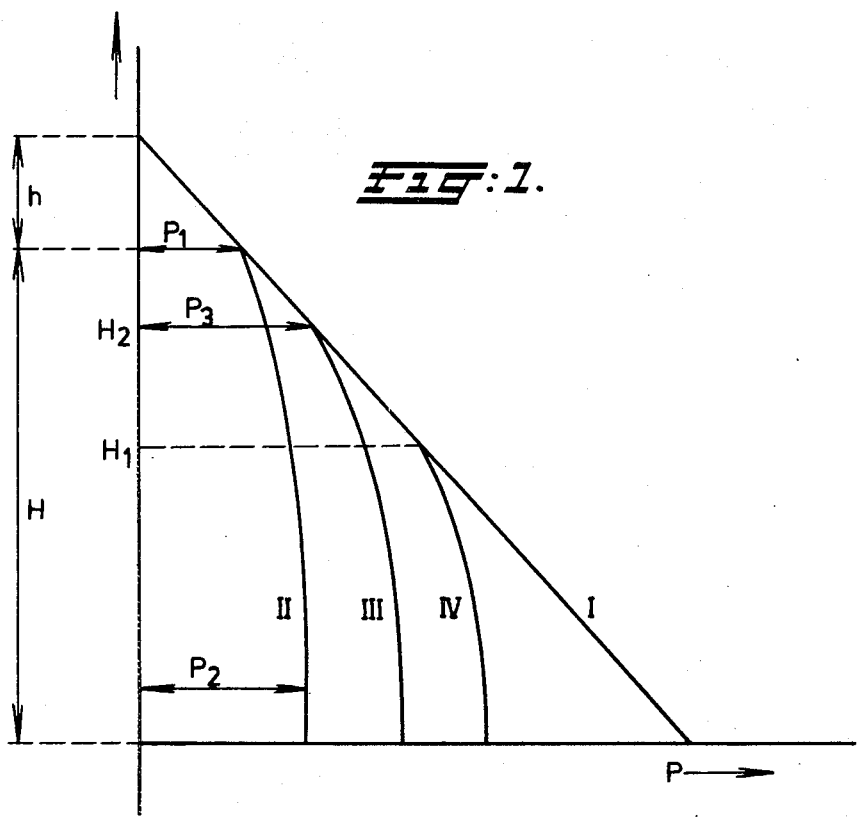
FIG:1.
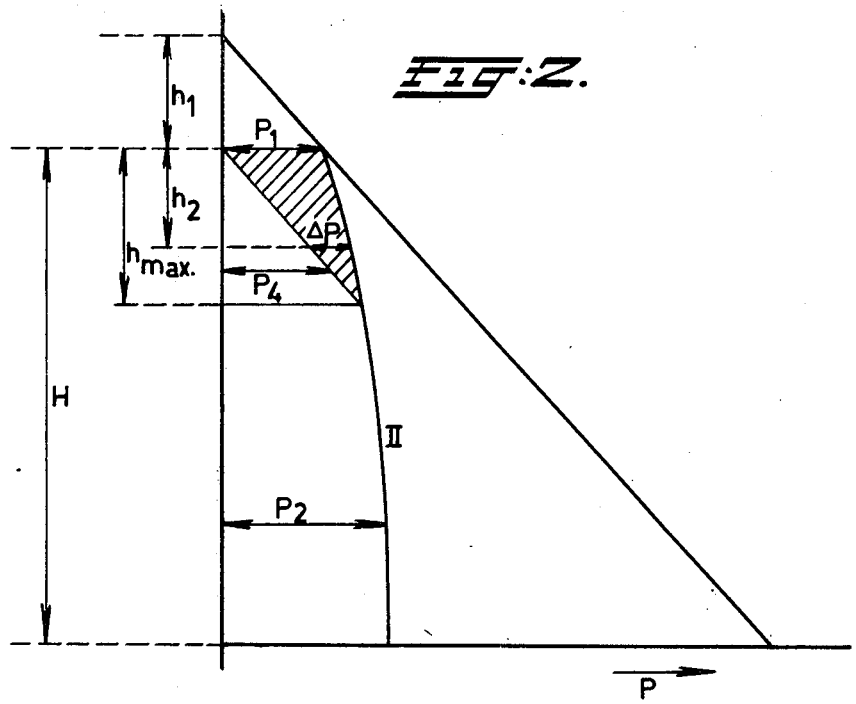
FIG:2.

COLUMN FOR DRAINING A WHEY-CURD MIXTURE

DISCUSSION OF THE PRIOR ART

My invention relates to a whey-curd draining column to be used in a cheese-producing machine, which column consists of an upright perforated sleeve which at its upper end is connected to a supply tank for a mixture of curd and whey and at its lower end cooperates with a discharge member for the curd. Such a column is known in various types of cheese-producing devices f.i. U.S. Pat. No. 3,217,411.

A draining column serves to separate whey from whey-curd mixture, since whey issues via the perforations in the sleeve so that thus a certain thickening of the curd within occurs. A phenomenon which may happen during the draining process consists in that the perforated sleeve may become clogged. Such an obstruction begins at the upper end of the sleeve and progresses in a downward direction, this obstruction being accelerated owing to an increasing downward static pressure of the whey-curd column and to a pressure difference on the perforations caused thereby. This clogging results in a limited separation of the whey so that no gradually discharging "bar" of thickened curd will be formed at the lower end of the column. Hence the contents of the draining column remain fluid causing the risk that the whole column flows out at once when the discharge opening is released.

BACKGROUND OF THE INVENTION

My invention aims to eliminate this disadvantage, starting from the consideration that clogging of the perforations of the sleeve is particularly caused by a too rapid outflow of the whey. This accelerated outflow is due to the too great pressure differences in the interior of the column relative to its viscosity. In particular near the upper end of the sleeve where the fluidity of the whey-curd mixture is at its height, a fast outflow of the whey through the perforations may occur, resulting in a clogging of that part of the sleeve.

Clogging of the perforations in the upper region of the sleeve is responsible for the fact that the whey-curd mixture supplied to that region is hardly or not at all thickened, so that the full static pressure of that part of the whey-curd column remains effective. When a certain thickening of this mixture is accomplished in the upper area of the sleeve, the static pressure will decrease, owing to the increased viscosity of the thickened curd. Consequently in case of clogging in the upper region of the sleeve a pressure increase in the lower region of the cylinder becomes noticeable. Due to this pressure increase a clogging of the perforations in that zone will become aggravated. When on the contrary no clogging occurs in said upper region of the sleeve, then the pressure in the lower part of the whey-curd column remains smaller, while in the central and lower part of the sleeve clogging will hardly or not at all happen.

SUMMARY OF THE INVENTION

The prevention of any clogging of the perforations in the upper part of the sleeve and a decrease of the static pressure in the central and lower part of the whey-curd column, resulting therefrom, are achieved according to my invention in that a jacket is arranged around the upper part of the perforated sleeve, said jacket encircling the sleeve at its lower end via a sealing, and forming an annular space around the sleeve and which jacket has such a length that at its lowermost point the absolute liquid pressure is not higher than the absolute pressure within the sleeve.

Due to this feature a quantity of liquid, e.g. whey, can be collected in the annular space owing to which a downwardly increasing counter pressure with respect to the whey-curd mixture within the sleeve is produced. This counter pressure prevents the whey from flowing out too fast from that part of the sleeve surrounded by said jacket. As a consequence clogging will be slackened and prevented from extending downwardly, so that a gradual thickening of the curd can be effected, while in the central and lower part of the whey-curd column an almost constant static pressure will prevail.

SURVEY OF THE DRAWINGS

FIG. 1 represents a graph showing the course of pressure within a curd-whey-column; this pressure course is rather dependent on the condition of the perforations in the sleeve.

FIG. 2 represents a graph showing the course of pressure within a whey-curd column and the course of pressure within the jacket and the pressure difference $\Delta P$.

The graph in FIG. 1 shows by means of line I, the course of pressure within a draining column when all perforations are clogged. This line I shows a linear increase of the pressure calculated from the upper to the lower end of the column. The pressure is plotted along the abscissa and along the ordinate are plotted the height H of the column and the height $h$ of the filling tank arranged over the column.

Line II shows the situation strived for in a draining column of a cheese producing machine. The course of line II is such that from the upper end of the column at which the pressure has reached its maximal value $P_1$, this pressure increases less fast than according to line I, which is due to the gradual thickening of the mixture. From a height indicated at $H_1$ the static pressure $P_2$ in the whey-curd column no longer increases, whereby a gradual outflow of the whey in the central and lower area of the column is ensured.

Line III indicates the situation in which the upper part of the column is clogged as far as level $H_2$. The static pressure in the whey-curd column increases linearly from the upper end and gets a value $P_3$, whereupon a gradual diminishing of said increase takes place. This increased pressure relative to line II may cause a gradually faster progressing clogging from level $H_2$ as far as level $H_1$, so that a pressure course is produced which is indicated by line IV. Should clogging of the perforations of the column progress to a further extent, then the situation as indicated by the line I may arise. This means that no thickening or hardly any thickening is produced and that a complete outflow of the curd column can occur when the lower end is in the open position.

FIG. 2 shows the effect of the provision according to the invention, viz. a jacket around the upper part of the draining column. This jacket has a length $h_2$, pressure $P_4$ at its lower end never exceeding pressure $P_1$ in the column.

$$\Delta P = P_1 - P_4 \ldots \tag{1}$$

$$P_1 \geqq \Delta P \geqq 0 \ldots \qquad (2)$$

In the case of $h_{max}\Delta P = 0$.

Figure 3:
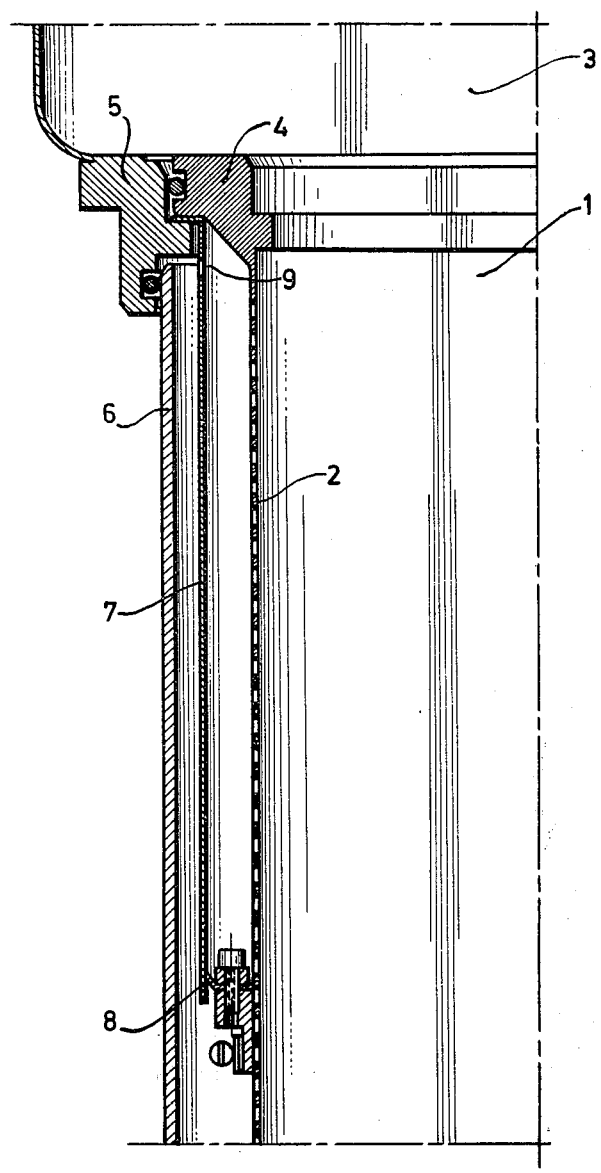
FIGS. 3 and 4 show two embodiments of a draining column.
Figure 4:
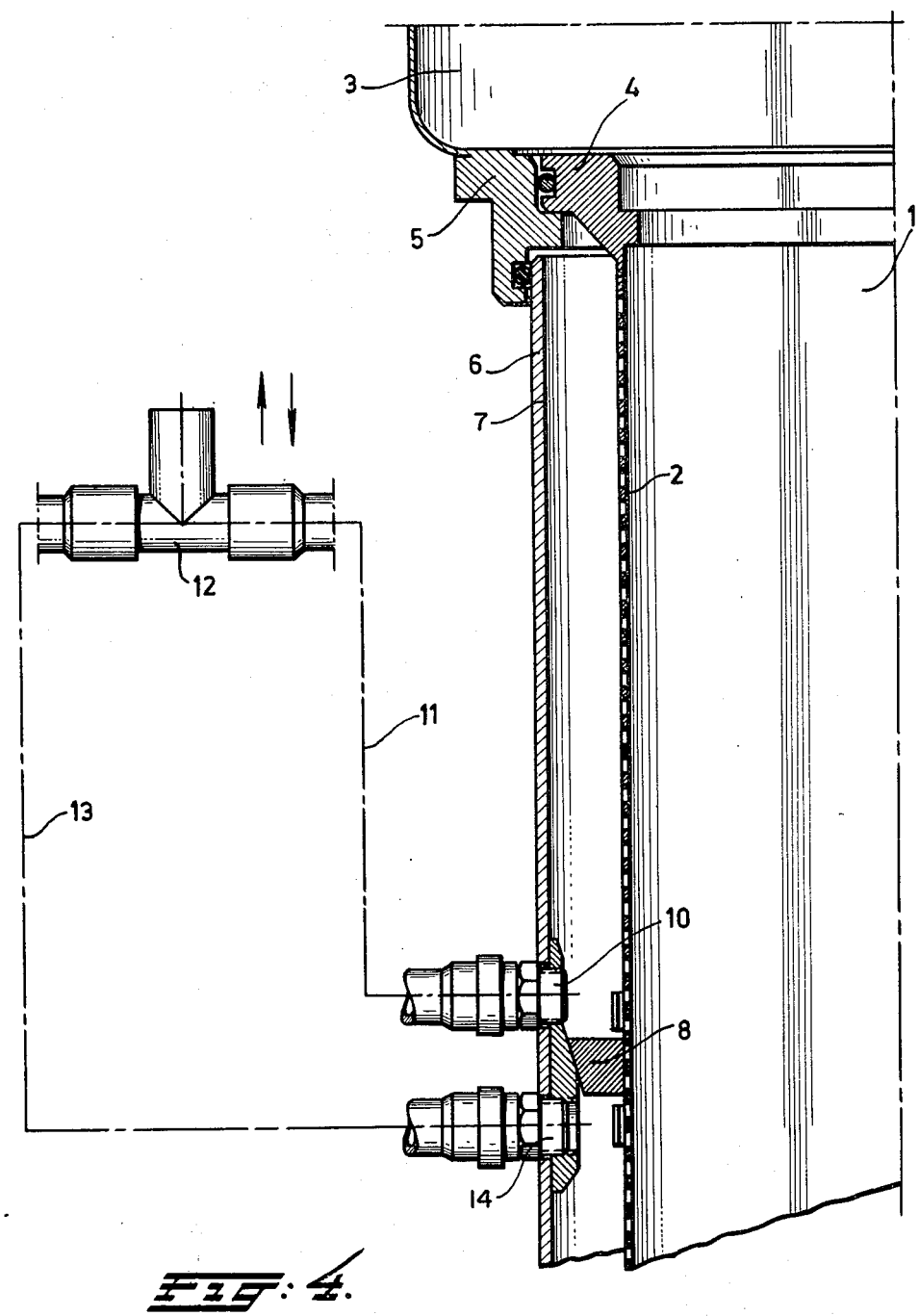

FIGS. 3 and 4, showing a longitudinal section through the upper part of a whey-curd column, illustrate the structural features which should prevent any clogging of perforations in the upper part of the sleeve. As is seen in these Figures the column consists of a perforated upright sleeve 2 which is connected at its upper end to a supply 3, also called filling tank, for a whey-curd mixture. At its lower end the sleeve 2 cooperates with a discharge member (not shown) for the curd, as is usual in a cheese-producing machine, see e.g. U.S. Pat. No. 3,217,411. The sleeve 2 is at its upper end secured in an annular mounting 4 which sealingly fits in a ring 5, the latter being integral with filling tank 3. A protective bushing 6 is in the usual way disposed on the outside of sleeve 2 for receiving and downwardly discharging the outflowing whey.

The provision according to my invention consists of a jacket 7 arranged around the upper region of the perforated sleeve 2. At its lower end this jacket adjoins sleeve 2 via a sealing member 8. In this manner an annular space is defined between the sleeve 2 and the jacket 7. At its upper end the jacket 7 is provided with an overflow 9 for liquid. The sealing member 8 is secured to the sleeve 2, so that the jacket 7 can be moved upwards and downwards which may be useful when mounting and dismounting same.

Due to the presence of the jacket 7 a quantity of liquid can be contained in the annular space between this jacket and the sleeve 2. This liquid will mostly consist entirely or for the greater part of whey separated from the whey-curd mixture. This mixture is, however, constantly supplied to the column 1 from the filling tank 3. The liquid in the aforementioned annular space will cause a certain counter pressure with respect to the mixture within the sleeve 2 and consequently slow down the outflow of whey. The pressure in the annular space remains constant, since through the overflow 9 a fixed level for the liquid is maintained.

In the embodiment according to FIG. 4 the upper part of the protective bushing 6 is at the same time part of the jacket 7, while a sealing member 8 is likewise arranged between the sleeve and the jacket 7 (bushing 6). This embodiment is provided with a connection 10 in the jacket 7 at an arbitrary location in the bushing 6, the connection being connected with a pipe 11 in this case consisting of a flexible hose. At its other end this hose 11 is connected with an open T-piece 12 the placement of which is adjustable in height. Thus the level in the annular space between the sleeve 2 and the jacket 7 can be adjusted too. The third leg of the T-piece 12 communicates via a hose 13 with a connection 14 in the bushing 6 for discharging any whey which has entered the aforementioned space via the perforations of the sleeve 2.

In the two embodiments shown in FIGS. 3 and 4 the liquid level in the annular space between the sleeve 2 and the jacket 7 can be adjusted either by sliding the jacket 7 by displacing the sealing member 8 (FIG. 3), or by moving the T-piece 12 upwards or downwards (FIG. 4).

What I claim is:

1. Whey-curd draining column to be used in a cheese-producing machine, which column consists of an upright, perforated sleeve connected at its upper end to a supply tank for a mixture of curd and whey and at its lower end cooperating with a discharge member for the curd, a jacket arranged around the upper part of the perforated sleeve, said jacket encircling the sleeve at its lower end via a sealing member, and forming an annular space around the sleeve and having such a length that at its lowermost point the absolute liquid pressure is not higher than the absolute pressure within the sleeve.

2. Draining column according to claim 1, in which the jacket is provided at its upper end with an overflow for the liquid.

3. Draining column according to claim 1, in which the jacket is adapted to have vertical sliding adjustment.

4. Draining column according to claim 1, in which a pipe is connected to said jackets the highest point of said pipe being adjustable.

* * * * *